US006916871B2

(12) United States Patent
Hare et al.

(10) Patent No.: US 6,916,871 B2
(45) Date of Patent: Jul. 12, 2005

(54) COMPOSITION AND METHOD FOR MAKING A FLUOROELASTOMER

(75) Inventors: Erik D. Hare, St. Paul, MN (US); William D. Coggio, Hudson, WI (US); Klaus Hintzer, Kastl (DE); Robert E. Kolb, Afton, MN (US); Peter J. Scott, Madison, AL (US); Alain Verschuere, Gent (BE); Harald Kaspar, Burgkirchen (DE)

(73) Assignee: 3M Innovative Properties Company, St. Paul, MN (US)

( * ) Notice: Subject to any disclaimer, the term of this patent is extended or adjusted under 35 U.S.C. 154(b) by 18 days.

(21) Appl. No.: 10/281,723

(22) Filed: Oct. 28, 2002

(65) Prior Publication Data

US 2003/0104219 A1 Jun. 5, 2003

Related U.S. Application Data

(60) Provisional application No. 60/336,474, filed on Oct. 31, 2001.

(51) Int. Cl.$^7$ ................................................ C08K 5/24
(52) U.S. Cl. ...................... 524/265; 524/544; 526/242; 428/424.6
(58) Field of Search .............................. 524/265, 544; 526/242; 428/424.6

(56) References Cited

U.S. PATENT DOCUMENTS

| | | | |
|---|---|---|---|
| 3,876,654 A | 4/1975 | Pattison | |
| 4,000,356 A | 12/1976 | Weisgerber et al. | |
| 4,214,060 A | * 7/1980 | Apotheker et al. | ......... 525/387 |
| 4,233,421 A | 11/1980 | Worm | |
| 4,501,869 A | 2/1985 | Tatemoto et al. | |
| 4,745,165 A | 5/1988 | Arcella et al. | |
| 4,831,085 A | 5/1989 | Okabe et al. | |
| 4,912,171 A | 3/1990 | Grootaert et al. | |
| 5,086,123 A | 2/1992 | Guenthner et al. | |
| 5,262,490 A | 11/1993 | Kolb et al. | |
| 5,378,782 A | * 1/1995 | Grootaert | .................... 526/255 |
| 5,591,804 A | 1/1997 | Coggio et al. | |
| 5,929,169 A | 7/1999 | Jing et al. | |
| 6,329,469 B1 | * 12/2001 | Bowers et al. | .............. 525/264 |
| 2002/0132074 A1 | * 9/2002 | Gervasi et al. | ............ 428/35.7 |

FOREIGN PATENT DOCUMENTS

| | | |
|---|---|---|
| EP | 0 661 304 A1 | 7/1995 |
| EP | 0 761 735 A1 | 3/1997 |
| EP | 0 769 521 A1 * | 4/1997 |
| EP | 0 784 064 A1 | 7/1997 |

OTHER PUBLICATIONS

*Encyclopedia of Polymer Science & Engineering*, Second Edition, V. 15, *Silicones*, pp. 204–308, John Wiley & Sons.
*Journal of American Chemical Society*, V. 116, 1994, pp. 4521–4522.
*Modern Fluoropolymers*, edited by John Scheirs, Wiley Science, 1997—pp. 71–76.

* cited by examiner

*Primary Examiner*—David W. Wu
*Assistant Examiner*—Henry S. Hu
(74) *Attorney, Agent, or Firm*—Brian E. Szymanski

(57) ABSTRACT

A composition and method for making a fluoroelastomer is disclosed. The composition comprises a fluoroelastomer containing chlorine and an organic compound containing at least an hydride function. The hydride function has the formula MH where M is Si, Ge, Sn or Pb.

25 Claims, No Drawings

COMPOSITION AND METHOD FOR MAKING A FLUOROELASTOMER

This application claims priority to U.S. Provisional Patent Application No. 60/336,474, filed Oct. 31, 2001.

FIELD

The present invention relates to a composition and method for making a fluoroelastomer. In particular, the present invention relates to a composition for making a fluoroelastomer, which composition includes an organic compound having one or more hydride functions MH. The invention further relates to fluoroelastomers that can be obtained with such a composition and a method of obtaining fluoroelastomers. The invention also relates to a premix for preparing a curable fluoroelastomer composition.

BACKGROUND

Fluoroelastomers and in particular perfluoroelastomers such as those described in "Modern Fluoropolymers", edited by John Scheirs, Wiley Science 1997, offer excellent protection against high service temperatures and are resistant to a wide variety of chemical reagents. Because they have excellent heat resistance and oil resistance, fluoroelastomers have been used in the past for O-rings, gaskets, oil seals, diaphragms, hoses, rolls, sheeting materials, in a variety of industrial applications which include automobiles, boats, aircraft, hydraulic machinery, general machinery, and in fields related to prevention of pollution. In the automotive field, the heat resistance and oil resistance of fluoroelastomers are commonly utilised in fuel management systems. Parts of the fuel management systems in which fluoroelastomers are often used include fuel tanks, fuel hoses, in-tank hoses and filler hoses.

Fluoroelastomers are typically obtained by curing a generally amorphous fluoropolymer. Two main systems are known today to effect curing of fluoropolymers, i.e. polymers that have a partially or fully fluorinated backbone. One cure system is based on the use of a polyhydroxy compound generally in combination with an onium compound. The second well known cure system is based on a peroxide cure reaction and requires besides the presence of an organic peroxide also the presence of special cure sites in the fluoropolymer which makes the fluoroelastomers obtained with a peroxide cure system generally more expensive than a cure system based on polyhydroxy compounds. These special cure sites comprise bromine and/or iodine which is capable of participating in the organic peroxide cure reaction. It is generally believed that such bromine or iodine atoms are abstracted in the free radical peroxide cure reaction, thereby causing in the presence of coagents, the fluoropolymer molecules being linked together to a three dimensional network. Chlorine is generally not capable of being abstracted in such a reaction and has so far not been used as a cure site for a peroxide cure system.

For example, EP 761735 describes curable fluoroelastomer compositions that require the presence of bromine in the fluoropolymer in order to obtain a peroxide curable system. In particular, EP 761735 teaches that the cure reaction involving homolytic scission of C—Br bonds can be accelerated by using certain metalorganic hydrides. EP 761735 does not appreciate the possibility of using chlorine as a cure site.

A disadvantage of the so called peroxide cure systems is that they require the presence of bromine or iodine in the fluoropolymer which leads to inconveniences in the manufacturing of such fluoropolymer and generally increases costs of such fluoropolymers. On the other hand, polyhydroxy cure systems do not require the presence of bromine or iodine but suffer from the disadvantage that some of the physical properties and thermal properties of the resulting fluoroelastomer may be inferior to those of the peroxide cure system.

It would now be desirable to find a further cure system for curing fluoropolymers and to make fluoroelastomers. Desirably, such a cure system would allow producing fluoroelastomers in a convenient and cost effective way. Desirably, the fluoroelastomers produced with the new cure system have similar or improved physical and mechanical properties as fluoroelastomers produced with cure systems of the prior art in particular compared with fluoroelastomers obtained with the known peroxide cure system.

SUMMARY

In accordance with the present invention, it was found that by including an organic compound having one or more hydride functions MH wherein M is selected from the group consisting of Si, Ge, Sn and Pb, a fluoropolymer containing chlorine can be cured using a free radical generating compound. The free radical generating compound is typically an organic peroxide but other free radical generating compounds such as azo compounds can be used also. In particular, it was found that in the presence of the organic compound, the chlorine atoms of the fluoropolymer are capable of participating in a free radical cure reaction, such as for example in a peroxide cure reaction, whereas in absence of the organic compound the chlorine atoms were not able to participate in a peroxide cure reaction. Therefore, even fluoropolymers that do not include bromine or iodine can be cured according to the present invention. As a result, fluoroelastomers with excellent physical and mechanical properties can be obtained generally in a cost effective and convenient way. Additionally, the fluoroelastomers can be readily bonded to a variety of substrates including for example silicone rubbers, non-fluorinated elastomers, metal substrates and fluorothermoplastic substrates such as fluorothermoplastic barrier layers that are used in fuel management systems.

Thus, in one aspect, the present invention relates to a composition for making a fluoroelastomer comprising chlorine containing fluoropolymer and the organic compound having one or more hydride functions MH. The chlorine containing fluoropolymer is a polymer that has a partially or fully fluorinated backbone and that further comprises chlorine. The chlorine atoms may be attached to the backbone, be present in an end group of the polymer or they may be present in a side group of the polymer. Typically, the chlorine atoms are attached to a carbon atom of the fluoropolymer. Generally, the amount of chlorine contained in the fluoropolymer is between 0.001% by weight and 30% by weight, for example between 0.01% by weight and 15% by weight based on the weight of the fluoropolymer. Further, the fluoropolymer will generally be an amorphous or substantially amorphous fluoropolymer and the fluoropolymer may have a monomolecular weight distribution as well as a multimodal molecular weight distribution, e.g. a bimodal molecular weight distribution. By "amorphous or substantially amorphous" is meant that the polymer does not display or marginally displays a melting point such that upon curing an elastomeric polymer can be obtained. Alternatively, it may also be possible to obtain a fluoropolymer upon curing of semi-crystalline fluoropolymers that have a melting point of less than 100° C.

The composition may further include a polyhydroxy compound. Such composition has the advantage that it can be cured by two curing mechanisms allowing for more flexibility in that the benefits of both cure systems can be combined into one composition. In particular, the bonding properties to other substrates can be improved with such a dual cure system.

A curable composition, which upon curing provides a fluoroelastomer is typically obtained by including in the aforementioned composition a free radical generating compound and a coagent that has one or more groups capable of participating in a free radical curing reaction. Typically, such a coagent is an unsaturated compound that has one or more unsaturated groups such as ethylenically unsaturated groups.

A fluoroelastomer can be obtained from a curable fluoroelastomer composition by heating the composition while optionally applying pressure. Preferably, the curable composition is prepared only shortly before curing from a premix. According to a further aspect of the present invention, a premix is also provided which comprises the fluoropolymer containing chlorine, the organic compound having MH functions and whereby a curable composition can be obtained from the premix by adding an organic peroxide thereto. Such a premix offers the advantage of generally good storage stability and further offers the advantage that a curable composition can be prepared in a reproducible and convenient way by adding organic peroxide to the premix.

As mentioned above, the present invention provides for the possibility of using chlorine atoms on a fluoropolymer as cure sites in a free radical cure reaction such as a peroxide cure reaction. Accordingly in another aspect, the present invention relates to the use of chlorine atoms of a chlorine containing fluoropolymer as cure sites in a free radical cure reaction to obtain a cured fluoroelastomer composition from a curable fluoroelastomer composition that contains the chlorine containing fluoropolymer, a free radical generating compound, a compound having one or more groups capable of participating in a free radical cure reaction and the organic compound having one or more hydride functions MH.

The invention in a further aspect also relates to a method of making chlorine containing fluoropolymers that have chlorine in an end group. A method for producing such a fluoropolymer comprises the polymerization of one or more fluorinated monomers optionally in combination with one or more non-fluorinated monomers whereby the polymerization is initiated with a chlorine containing initiator and/or is initiated in the presence of a chlorine source such as for example a chloride salt.

DETAILED DESCRIPTION

The organic compound having one or more hydride functions MU may be a simple organic compound or can be a polymeric compound. By "polymeric compound" is meant that the compound comprises repeating units that are actually or conceptually derived from lower molecular weight compounds, i.e. monomers. The polymerization degree may vary widely and includes a low polymerization degree such as for example a polymerization degree of 2 to 50 repeating units as well as a large polymerization degree of more than 50. Thus, the term "polymeric compound" should be understood to include oligomeric compounds that typically have a low polymerization degree. If the organic compound is polymeric, the hydride function may be contained in the terminating group of the polymeric chain and/or in a repeating unit of the polymeric compound.

The organic compound having one or more MH functions is typically a non-fluorinated compound although the possibility of using an organic compound that has fluorine substituents is not excluded.

In one embodiment of the present invention, the organic compound is a siloxane or a silazene that comprises one or more MH functions. Typically, when the organic compound is a siloxane or a silazene, the MH functions will be —SiH functions. Preferably, the SiH function will be an —OSiH or a —NSiH whereby the hydrogen is attached to a silicon atom that is further bonded to an oxygen or nitrogen atom. The siloxane of silazene may be a simple low molecular weight organic compound or may be a polymeric compound including for example a polysiloxane which may be linear, branched or cyclic.

Examples of low molecular weight siloxanes include for example alkoxy silanes corresponding to the formula:

$(R^a)_s(R^bO)_t SiH_w$ (I)

wherein each $R^a$ independently represents an alkyl group such as for example methyl or ethyl or another lower alkyl ($C_1$–$C_7$ alkyl group) or an alkyl group substituted with a substituent such as for example an aryl group, an ester, an alkoxy etc., or aryl group optionally substituted such as for example with an alkyl group, an ester, an alkoxy etc., each $R^b$ independently represents an alkyl group, preferably a lower alkyl group and which may optionally be substituted, t and w represent an integer of at least 1 and the sum of s+t+w being 4. Examples of siloxanes according to the above formula include $HSi(OCH_2CH_3)_3$ and $(CH_3)_2(CH_3CH_2O)SiH$.

In accordance with another embodiment in connection with the present invention, the organic compound is a polysiloxane (oligomer or polymer), comprising a polysiloxy backbone. Such polymer or oligomer may be terminated by a group containing one or more SiH functions and/or may contain SiH groups distributed along the backbone. The SiH groups may form part of the backbone or they can be present in a side group attached to the backbone.

For example, the polysiloxanes for use with this invention include those that correspond to the formula:

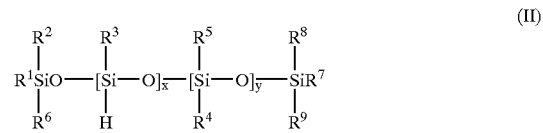

(II)

wherein $R^1$, $R^2$, $R^3$, $R^6$, $R^7$, $R^8$ and $R^9$ each independently represents hydrogen, an alkoxy group, an alkyl optionally substituted such as for example with an aryl group, an ester, an alkoxy etc., or aryl group optionally substituted such as for example with an alkyl group, an ester, an alkoxy etc., $R^4$ and $R^5$ each independently represents an alkoxy group, an alkyl or aryl group each of which may optionally be substituted, x represents a value of 0 to 150, y represents a value of 0 to 150 and with the proviso that when x=0, at least one of $R^1$, $R^2$, $R^6$, $R^7$, $R^8$ and $R^9$ represents a hydrogen atom.

Specific examples of siloxanes include 1,1,3,3 tetraisopropyl disiloxane, diphenyl-1,1,3,3-tetrakis(dimethylsiloxy) disiloxane available from United Chem, silylhydride terminated poly(dimethylsiloxane), poly(methyl hydro siloxane) and copolymers of dimethylsiloxane and methylhydrosiloxane.

Further siloxanes that can be used may be cyclic such as those corresponding to the formula:

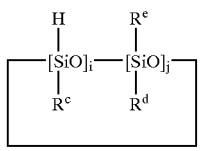
(III)

wherein $R^c$ represents hydrogen, an alkyl group or an aryl group, $R^d$ and $R^e$ each independently represents an alkyl or aryl group, i is at least 1 and the sum of i+j is at least 3. Specific examples of cyclic siloxanes according to the above formula are 1,3,5-trimethyl cyclosiloxane and 1-phenyl-3,3,5,5-tetramethyl cyclosiloxane.

Polysiloxanes and siloxanes having SiH groups are known in the art and can be produced according to well-known procedures such as disclosed in for example: Encyclopedia of Polymer Science and Engineering, Second Edition, V15, Silicones, pgs. 204–308, John Wiley & Sons, 1989. Siloxanes having SiH groups are also generally commercially available. Preferably, the siloxane or polysiloxane will have a molecular weight between 150 g/mol and 10 000 g/mol.

Suitable silazanes for use with the invention include for example disilazanes corresponding to the formula:

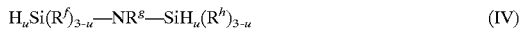
(IV)

wherein u is 1 or 2, $R^f$ and $R^h$ each independently represents an alkyl group or an aryl group and $R^g$ represents hydrogen, an alkyl group or an aryl group. A specific example of a silazane is $HSi(CH_3)_2$—NH—$Si(CH_3)_2H$.

In a further embodiment of the present invention, the organic compound corresponds to the formula:

(V)

wherein R represents a hydrocarbon group optionally comprising one or more substituents and wherein the R groups may be the same or different and whereby two R groups may be linked to each other so as to form a ring, M is selected from Si, Ge, Sn and Pb, q is a value of 1 to 3, x is a value of 1 to 3, y and z represent a value of 0 to 3 and the sum of y+z=4−x. Examples of substituents that may be present on the hydrocarbon group R include alkoxy, aryloxy, halogens such as chlorine and bromine, nitrile groups, hydroxy groups and amino groups. The backbone of the hydrocarbon group may further be interrupted by one or more heteroatoms such as for example oxygen and nitrogen atoms. Typical examples of hydrocarbon groups include saturated or unsaturated linear, branched or cyclic aliphatic groups and aromatic groups. Specific examples are $C_1$–$C_5$ alkyl groups, aryl groups having 6 to 12 carbon atoms, arylalkyl and alkylaryl groups having 7 to 14 carbon atoms.

Compounds according to formula (V) include in particular those according to formula (VI):

(VI)

wherein R, y and x have the same meaning as above. Preferably, R in the above formula (VI) is an aryl group such as for example phenyl.

Compounds of formula (V) and (VI) are known and have been described in for example J. Am. Chem. Soc., 116 (1994), page 4521–4522. Examples of compounds according to formula V include tri(n-butyl)tin hydride, tri(ethyl) silyl hydride, di(trimethylsilyl)silylmethyl hydride, tri (trimethylsilyl)silyl hydride, tri(phenyl)silyl hydride. Compounds of formula (V) have further been disclosed in EP 761 735.

The amount of organic compound used in a composition for preparing a fluoroelastomer may vary widely and the optimal amount can be readily determined by one skilled in the art through routine experimentation. Typically, an amount of 0.01% by weight to 5% by weight, preferably between 0.1% by weight and 4% by weight based on the weight of fluoropolymer is included in the composition.

The fluoropolymer of the composition for making the fluoroelastomer is chlorine containing and may have a partially or fully fluorinated backbone. Particularly preferred fluoropolymers are those that have a backbone that is at least 20% by weight fluorinated, preferably at least 40% by weight fluorinated, more preferably at least 65% by weight fluorinated.

Examples of fluoropolymers for use in this invention include polymers of one or more fluorinated monomers optionally in combination with one or more non-fluorinated monomers. Examples of fluorinated monomers include fluorinated $C_2$–$C_8$ olefins such as tetrafluoroethylene (TFE), vinyl fluoride, vinylidene fluoride (VDF) and fluorinated alkyl vinyl monomers such as hexafluoropropylene (HFP); fluorinated vinyl ethers, including perfluorinated vinyl ethers (PVE) and fluorinated allyl ethers including perfluorinated allyl ethers. Suitable non-fluorinated comonomers include and $C_2$–$C_8$ olefins such as ethylene (E) and propylene (P).

Examples of perfluorovinyl ethers that can be used in the invention include those that correspond to the formula:

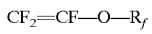

wherein $R_f$ represents a perfluorinated aliphatic group that may contain one or more oxygen atoms.

Particularly preferred perfluorinated vinyl ethers correspond to the formula:

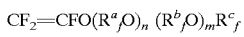

wherein $R^a_f$ and $R^b_f$ are different linear or branched perfluoroalkylene groups of 1–6 carbon atoms, in particular 2 to 6 carbon atoms, m and n are independently 0–10 and $R^c_f$ is a perfluoroalkyl group of 1–6 carbon atoms. Specific examples of perfluorinated vinyl ethers include perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxyethylvinyl ether and $CF_3$—$(CF_2)_2$—O—$CF(CF_3)$—$CF_2$—O—$CF(CF_3)$—$CF_2$—O—$CF$=$CF_2$.

Suitable perfluoroalkyl vinyl monomers correspond to the general formula:

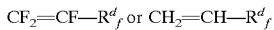

wherein $R^d_f$ represents a perfluoroalkyl group of 1 to 10, preferably 1 to 5 carbon atoms. A typical example of a perfluoroalkyl vinyl monomer is hexafluoropropylene.

Specific examples of fluoropolymers include for example copolymers comprising a combination of monomers as follows: VDF-HFP, TFE-P, VDF-TFE-HFP, VDF-TFE-PVE, TFE-PVE, E-TFE-PVE it being understood that these polymers further include a chlorine containing monomer or otherwise include chlorine through the use of a chlorine containing initiator or chain transfer agent during their manufacturing. Particularly preferred are any of the aforementioned copolymers further including units derived from a chlorine containing monomer such as CTFE. Still further examples of suitable fluoropolymers include copolymers comprising a combination of monomers as in CTFE-P or CTFE-VDF.

At least one fluoropolymer in the composition for making the fluoroelastomer should contain chlorine atoms. The chlorine atoms may be introduced into the fluoropolymer during its manufacturing by using a chlorine containing initiator system, a chlorine containing chain transfer agent or by using a chlorine containing monomer. Suitable chlorine containing monomers include fluorinated as well as non-fluorinated monomers. Examples of fluorinated chlorine containing monomers include fluorinated $C_2$–$C_8$ olefins that further have one or more chlorine atoms such as chlorotrifluoroethylene (CTFE), 2-chloropentafluoropropene and dichlorodifluoroethylene and any of the aforementioned fluorinated monomers such as for example fluorinated vinyl ethers, in which one or more hydrogen or fluorine atoms are replaced with chlorine. Examples of chlorine containing non-fluorinated monomers that can be used include chlorinated $C_2$–$C_8$ olefins such as vinyl chloride and vinylidene chloride Chlorine may further be introduced into the fluoropolymer in an end group of the fluoropolymer through the use of an appropriate initiator system or a suitable chain transfer agent. Initiator systems capable of introducing chlorine into the fluoropolymer include systems based on a free radical initiator and a chlorine source such as a chloride salt, e.g. sodium chloride or ammonium chloride or a free radical initiator that contains chlorine such as for example $Cl(CF_2)_nSO_2Na$ wherein n is a number of 1 to 10, for example 2 to 5. Suitable chain transfer agents that can introduce chlorine in the polymer include $CCl_4$, $CH_2Cl_2$, chloroform, $Cl-CH_2COOC_2H_5$ and $CF_2ClBr$.

The amount of chlorine contained in the fluoropolymer can vary widely and can be readily determined by one skilled in the art through routine experimentation. Typically, the amount of chlorine in the fluoropolymer is between 0.001% by weight and 30% by weight, conveniently between 0.01% by weight and 15% by weight, preferably between 0.01% by weight and 10% by weight, more preferably between 0.1% by weight and 8% by weight based on the weight of the fluoropolymer.

The chlorine containing fluoropolymer may further contain bromine and/or iodine atoms although such is not mandatory in the cure system of this invention. In order to introduce bromine/iodine along the chain, the copolymerization of the basic monomers of the fluoropolymer is carried out with a suitable fluorinated bromine or iodine containing cure-site monomer (see for instance U.S. Pat. Nos. 4,745,165, 4,831,085, and 4,214,060). Such comonomer can be selected for instance from:

(a) bromo- or iodo- (per)fluoroalkyl-perfluorovinylethers having the formula:

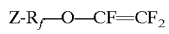

wherein Z is Br or I, $R_f$ is a (per)fluoroalkylene $C_1$–$C_{12}$, optionally containing chlorine and/or ether oxygen atoms; for example: $BrCF_2-O-CF=CF_2$, $BrCF_2CF_2-O-CF=CF_2$, $BrCF_2CF_2CF_2-O-CF=CF_2$, $CF_3CFBrCF_2-O-CF=CF_2$, and the like;

(b) bromo- or iodo (per)fluoroolefins such as those having the formula:

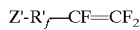

wherein Z' is Br or I, $R'_f$ is a (per)fluoroalkylene $C_1$–$C_{12}$, optionally containing chlorine atoms; for instance: bromotrifluoroethylene, 4-bromo-perfluorobutene-1, and the like; or bromofluoroolefins such as 1-bromo-2,2-difluoroethylene and 4-bromo-3,3,4,4-tetrafluorobutene-1;

(c) non-fluorinated bromo-olefins such as vinyl bromide and 4-bromo-1-butene;

In replacement of or in addition to a bromine or iodine containing cure site comonomer, the fluoropolymer can contain a cure site component having bromine or iodine in terminal position, deriving from a suitable chain transfer agent introduced in the reaction medium during the polymer preparation, as described in U.S. Pat. No. 4,501,869 or derived from a suitable initiator. Examples of useful initiators include $X(CF_2)_nSO_2Na$ with n=1 to 10 (where X is Br or I) or an initiator composition comprising ammonium persulfate and potassium bromide.

Examples of chain transfer agents include those having the formula $R_fBr_x$, wherein $R_f$ is a x-valent (per)fluoroalkyl radical $C_1$–$C_{12}$, optionally containing chlorine atoms, while x is 1 or 2. Examples include $CF_2Br_2$, $Br(CF_2)_2Br$, $Br(CF_2)_4Br$, $CF_2ClBr$, $CF_3CFBrCF_2Br$, and the like. Further examples of suitable chain transfer agents are disclosed in U.S. Pat. No. 4,000,356.

The fluoropolymers for use in connection with the present invention can be made in accordance with any of the known polymerization methods for making fluoropolymers. Such methods include without limitation, aqueous emulsion polymerization, suspension polymerization and polymerization in an organic solvent.

The composition for making a fluoroelastomer also includes a free radical generating compound. By the term "free radical generating compound" is meant a compound that upon exposure to heat or actinic radiation such as for example UV, X-ray, β-ray radiation decomposes and thereby forms radicals. Typically, the free radical generating compound is a compound capable of initiating a free radical polymerization upon heating, a so called thermal initiator, or upon exposure to light, a so called photoinitiator. Examples of free radical generating compounds include for example persulfates such as ammonium persulfate alone or in combination with a suitable reducing agent such as a bisulfite or iron or copper; azo compounds such as for example azoisobutyronitrile.

In a preferred embodiment, the free radical generating compound is an organic peroxide. Suitable organic peroxides are those which generate free radicals at the desired curing temperatures. A dialkyl peroxide or a bis(dialkyl peroxide) which decomposes at a temperature above 50° C. is especially preferred. In many cases it is preferred to use a di-tertiarybutyl peroxide having a tertiary carbon atom attached to peroxy oxygen. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from such compounds as dicumyl peroxide, dibenzoyl peroxide, tertiarybutyl perbenzoate, α,α'-bis(t-butylperoxy-diisopropylbenzene), and di[1,3-dimethyl-3-(t-butylperoxy)-butyl]carbonate. Generally, about 1–3 parts of peroxide per 100 parts of fluoropolymer is used.

To obtain a curable composition, there should generally also be present a coagent which has one or more groups that are capable of participating in a free radical cure reaction. Preferably, a coagent is composed of a polyunsaturated compound which is capable of cooperating with the free radical generating compound and the organic compound having MH functions to provide a useful cure. These coagent can be added in an amount equal to 0.1 and 10 parts per hundred parts fluoropolymer, preferably between 2–5 parts per hundred parts fluoropolymer. Examples of useful coagents include triallyl cyanurate; triallyl isocyanurate; triallyl trimellitate; tri(methylallyl) isocyanurate; tris(diallylamine)-s-triazine, triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane N,N'-m-phenylene bis-maleimide; diallyl-phthalate and tri(5-norbornene-2-methylene)cyanurate. Particulary useful are triallyl isocyanurate and tri(methylallyl) isocyanurate. Other useful coagents include the bis-olefins disclosed in EPA 0 661 304 A1, EPA 0 784 064 A1 and EPA 0 769 521 A1.

According to a particular embodiment of the present invention, the composition for making a fluoroelastomer additionally comprises a polyhydroxy compound such that the composition may also be cured through a polyhydroxy cure system. In addition to the polyhydroxy compound, a polyhydroxy curing system generally also comprises one or more organo-onium accelerators in addition to the polyhydroxy compound. The organo-onium compounds useful in the present invention typically contain at least one heteroatom, i.e., a non-carbon atom such as N, P, S, O, bonded to organic or inorganic moieties and include for example ammonium salts, phosphonium salts and iminium salts. One class of quaternary organo-onium compounds useful in the present invention broadly comprises relatively positive and relatively negative ions wherein a phosphorus, arsenic, antimony or nitrogen generally comprises the central atom of the positive ion, and the negative ion may be an organic or inorganic anion (e.g., halide, sulfate, acetate, phosphate, phosphonate, hydroxide, alkoxide, phenoxide, bisphenoxide, etc.).

Many of the organo-onium compounds useful in this invention are described and known in the art. See, for example, U.S. Pat. No. 4,233,421 (Worm), U.S. Pat. No. 4,912,171 (Grootaert et al.), U.S. Pat. No. 5,086,123 (Guenthner et al.), and U.S. Pat. No. 5,262,490 (Kolb et al.), U.S. Pat. No. 5,929,169, all of whose descriptions are herein incorporated by reference. Representative examples include the following individually listed compounds and mixtures thereof:

triphenylbenzyl phosphonium chloride tributylallyl phosphonium chloride tributylbenzyl ammonium chloride tetrabutyl ammonium bromide triaryl sulfonium chloride 8-benzyl-1,8-diazabicyclo [5,4,0]-7-undecenium chloride benzyl tris(dimethylamino) phosphonium chloride benzyl(diethylamino)diphenylphosphonium chloride Another class of useful organo-onium compounds include those having one or more pendent fluorinated alkyl groups. Generally, the most useful fluorinated onium compounds are disclosed by Coggio et al. in U.S. Pat. No. 5,591,804.

The polyhydroxy compound may be used in its free or non-salt form or as the anionic portion of a chosen organo-onium accelerator. The crosslinking agent may be any of those polyhydroxy compounds known in the art to function as a crosslinking agent or co-curative for fluoroelastomers, such as those polyhydroxy compounds disclosed in U.S. Pat. No. 3,876,654 (Pattison), and U.S. Pat. No. 4,233,421 (Worm). Representative aromatic polyhydroxy compounds include any one of the following: di-, tri-, and tetrahydroxybenzenes, naphthalenes, and anthracenes, and

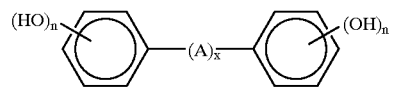

bisphenols of the following formula:

wherein A is a difunctional aliphatic, cycloaliphatic, or aromatic radical of 1 to 13 carbon atoms, or a thio, oxy, carbonyl, sulfonyl, or sulfonyl radical, A is optionally substituted with at least one chlorine or fluorine atom, x is 0 or 1, n is 1 or 2, and any aromatic ring of the polyhydroxy compound is optionally substituted with at least one atom of chlorine, fluorine, bromine, or with a carboxyl or an acyl radical (e.g., —COR where R is H or a C1 to C8 alkyl, aryl, or cycloalkyl group) or alkyl radical with, for example, 1 to 8 carbon atoms. It will be understood from the above bisphenol formula that the —OH groups can be attached in any position (other than number one) in either ring. Blends of two or more of these compounds are also used.

One of the most useful and commonly employed aromatic polyphenols of the above formula is 4,4'-hexafluoroisopropylidenyl bisphenol, known more commonly as bisphenol AF. The compounds 4,4'-dihydroxydiphenyl sulfone (also known as Bisphenol S) and 4,4'-isopropylidenyl bisphenol (also known as bisphenol A) are also widely used in practice.

A composition based on polyhydroxy compounds may further include an acid acceptor. Acid acceptors can be inorganic or blends of inorganic and organic. Examples of inorganic acceptors include magnesium oxide, lead oxide, calcium oxide, calcium hydroxide, dibasic lead phosphite, zinc oxide, barium carbonate, strontium hydroxide, calcium carbonate, etc. Organic acceptors include epoxies, sodium stearate, and magnesium oxalate. The preferred acid acceptors are magnesium oxide and calcium hydroxide. The acid acceptors can be used singly or in combination, and preferably are used in amounts ranging from about 2 to 25 parts per 100 parts by weight of the fluoropolymer.

The composition for making the fluoroelastomer may contain further additives, such as carbon black, stabilizers, plasticizers, lubricants, inorganic or organic fillers such as for example polymeric fillers, and processing aids typically utilized in fluoropolymer compounding can be incorporated into the compositions of the present invention, provided they have adequate stability for the intended service conditions.

The compositions may be prepared by mixing the fluoropolymer, a cure composition and the organic compound having hydride function(s) and other additives in conventional rubber processing equipment. Such equipment includes rubber mills, internal mixers, such as Banbury mixers, and mixing extruders.

In accordance with an embodiment of the invention to obtain fluoroelastomers, a curable fluoroelastomer composition comprising the chlorine containing polymer, the organic compound having MH functions, a free radical generating compound such as an organic peroxide and a coagent having one or more groups capable of participating in a free radical cure reaction is provided. Such a composition may then be cured upon exposure to heat or actinic radiation such as UV radiation.

Preferably, a fluoroelastomer is obtained therefrom by heating the curable composition to obtain a desired level of curing. The curable compositions can be used to form articles. By the term "article" in connection with the present invention is meant a final article such as for example an O-ring as well as preforms from which a final shape is made, e.g. a tube from which a ring is cut. To form an article, the curable composition can be extruded using a screw type extruder or a piston extruder. Alternatively, the curable composition can be shaped into an article using injection molding, transfer molding or compression molding. Compression molding consists of placing a quantity of cold curable composition into a heated mold cavity and subsequently closing the mold using adequate pressure to shape the article. After retaining the rubber at sufficient temperature during sufficient time to allow vulcanization to proceed it can then be demolded. Injection molding is a shaping technique whereby the curable composition is first heated and masticated in an extruder screw then collected in a heated chamber from which it is then injected into a hollow mold cavity by means of a hydraulic piston. After vulcanization the article can then be demolded. Transfer molding is similar to injection molding with the difference being that the curable composition is not preheated and masticated by an extruder screw but introduced as a cold mass in the heated injection chamber. Typical vulcanization conditions for curable composition are elevated temperatures e.g. 160° C. to 210° C., pressures above 7 bar and maintaining these conditions for 30 seconds, in fast injection molding processes to 5 minutes or longer for larger compression molded articles.

The fluoroelastomers that can be obtained with the invention can be used to make O-rings, gaskets, oil seals, diaphragms, hoses, rolls and sheeting materials. They can be used in a variety of industrial applications including automobiles, boats, aircraft, hydraulic machinery, general machinery, and in fields related to prevention of pollution. The fluoroelastomers of the invention are particularly useful in fuel management systems. Parts of the fuel management systems in which the fluoroelastomers can be used include fuel tanks, fuel hoses, in-tank hoses and filler hoses.

The fluoroelastomers of the present invention can furthermore be readily bonded to a variety of substrates including other elastomers such as non-fluorinated elastomers such as for example silicone rubbers or to layers of thermoplastic fluoropolymers. Thermoplastic fluoropolymers are typically polymers that are semi-crystalline, i.e they have a clear melting point, e.g. a melting point of more than 100° C., and they are preferably polymers that are processible from the melt. By 'processible from the melt' is meant that these polymers can processed by typical melt extrusion equipment. Layers of thermoplastic fluoropolymers are often used in fuel management systems as barrier layers for fuel. To effectively bond the thermoplastic fluoropolymer to the fluoroelastomer that are obtained with this invention, it will generally be desirable that the thermoplastic fluoropolymer is also a chlorine containing fluoropolymer or alternatively or additionally contains bromine or iodine as cure site components. Specific examples of thermoplastic fluoropolymers that may be used with this invention are copolymers having the following combination of monomers: CTFE-VDF; CTFE-TFE-HFP-VDF; CTFE-TFE-E; bromine or chlorine containing E-TFE copolymers and bromine or chlorine containing TFE-HFP-VDF copolymers.

To bond the fluoroelastomer to a substrate, a curable composition according to the invention can be provided on the surface of the substrate to which bonding is desired. Upon curing of the curable composition, bonding to the substrate can be achieved. If the substrate is a silicone rubber, the method of bonding may involve providing the curable composition on a silicone composition that upon curing will form a silicone rubber. By heating such a laminate, curing of both layers and bonding to each other may be effected simultaneously.

Various multi-layer articles can be made by bonding a fluoroelastomer obtained with this invention to other layers. For example, a multi-layer hose comprising the fluoroelastomer according to the invention as an innermost layer bonded to a silicone rubber may be obtained. Further, multi-layer construction such as for example in a fuel hose may be obtained wherein a fluorothermoplastic barrier layer is bonded to an innermost fluoroelastomer layer, the fluorothermoplastic barrier layer further being bonded to a non-fluorinated plastic or elastomer.

The invention is further illustrated with reference to the following examples which are in no way intended to limit the invention thereto. All parts are by weight unless otherwise indicated

EXAMPLES

Abbreviations:
VDF: vinylidene fluoride
HFP: hexafluoropropylene
CTFE: chlorotrifluoroethylene
TFE: tetrafluoroethylene
Varox® DBPH-50: 50% 2,5 dimethyl 2,5 di(t-butylperoxide)hexane on a $CaCO_3$ carrier.
N-990: Carbon black commercially available as Cabot N-990
TAIC: Triallylisocyanurate, added as a 72% dry-liquid concentrate as commercially available from Harwick
TMAIC: Trimethylallylisocyanurate
P-0660: Phenyltris(dimethylsiloxy)silane) $((C_6H_5)Si(OSi[CH_3]_2H)$
Polymer "A": polymer with the composition (by weight) of 44% VDF, 21% TFE, 27% HFP, and 8% CTFE. This polymer has a Mooney viscosity (ML 1+10 at 121° C.) as per ASTM D1646 of approximately 35.
Polymer "B": polymer with a composition (by weight) of 55% VDF and 45% CTFE. This polymer has a Mooney viscosity (ML 1+10 at 121C) as per ASTM D1646 in excess of 150.

Using polymer A or B, the formulations set forth in table 1 were prepared by compounding the polymers with the additives as indicated in table 1 on a two-roll mill.

The resulting compounds were tested in a Monsanto MDR as per ASTM D 2084-81 for curability at 177° C. for 12 minutes using 0.5 degree arc and 100 cycles per minute. Sheets were pressed out at 177° C. for 10 minutes (Press Cure) and then further cured in an oven at 230° C. for 16 hours (Post Cure), and each were tested in a Monsanto T-2000 Tensometer as per ASTM D 412. O-Rings were pressed at 177° C. for 10 minutes and post cured at 230° C. for 16 hours and tested for Compression Set at 200° C. for 70 hours, all as per ASTM D395-89. Data on these tests can be found in the table 1 below.

TABLE 1

| | Example number | | | | | | | |
| --- | --- | --- | --- | --- | --- | --- | --- | --- |
| | 1* | 1A | 1B | 2* | 2A | 2B | 3* | 3A |
| Polymer "A" | 100 | 100 | 100 | 100 | 100 | 100 | | |
| Polymer "B" | | | | | | | 100 | 100 |
| N-990 | 30 | 30 | 30 | 30 | 30 | 30 | 30 | 30 |
| Ca(OH)2 | 3 | 3 | 3 | 3 | 3 | 3 | 3 | 3 |
| DBPH-50 | 2.5 | 2.5 | 2.5 | 3.5 | 3.5 | 3.5 | 2.5 | 2.5 |
| TAIC (72%) | 3.5 | 3.5 | 3.5 | | | | 3.5 | 3.5 |
| TMAIC | | | | 2.5 | 2.5 | 2.5 | | |
| P-0660 | | | 1 | | | 2.7 | | 2 |

TABLE 1-continued

| | \* | 1A | 1B | 2\* | 2A | 2B | 3\* | 3A |
|---|---|---|---|---|---|---|---|---|
| Triphenylsilane | | 2 | | | 2 | | | |
| | | | MDR | | | | | |
| ML (Nm) | 0.8 | 0.8 | 0.8 | 0.7 | 0.7 | 0.5 | 6.9 | 6.2 |
| MH (Nm) | 2.7 | 13.7 | 7.8 | 6.0 | 17.4 | 18.3 | 20.8 | 25.3 |
| delta (Nm) | 1.9 | 12.9 | 7.0 | 5.3 | 16.7 | 17.9 | 13.9 | 19.1 |
| ts2 (min) | — | 0.6 | 0.7 | 4.7 | 1.8 | 1.8 | 0.2 | 0.2 |
| t'50 (min) | 0.9 | 0.8 | 0.8 | 5.2 | 3.5 | 3.2 | 0.7 | 0.7 |
| t'90 (min) | 2.1 | 1.5 | 1.6 | 9.4 | 7.4 | 6.3 | 2.2 | 1.4 |
| tan delta | 0.71 | 0.16 | 0.26 | 0.35 | 0.09 | 0.07 | 0.08 | 0.03 |
| | Press Cure, 177 C 10' as per ASTM D-412 | | | | | | | |
| Tensile (MPa) | NR | 8.9 | 4.2 | NR | 12.9 | 15.6 | 17.9 | 22.7 |
| Elongation (%) | NR | 300 | 460 | NR | 350 | 270 | 250 | 160 |
| Modulus (MPa) | NR | 2.4 | 1.3 | NR | 1.9 | 2.9 | 2.9 | 8.4 |
| Duro, Shore "A" | NR | 69 | 57 | NR | 67 | 68 | 66 | 69 |
| | Post Cure, 230 C 16 hr as per ASTM D-412 | | | | | | | |
| Tensile (MPa) | NR | 9.9 | 5.2 | NR | 16.9 | 21.0 | 21.3 | 31.5 |
| Elongation (%) | NR | 220 | 330 | NR | 270 | 240 | 210 | 170 |
| Modulus MPa | NR | 3.2 | 2.0 | NR | 3.5 | 4.3 | 4.3 | 10.8 |
| Duro, Shore "A" | NR | 74 | 68 | NR | 79 | 73 | 69 | 72 |
| | Comp Set, 200 C/70 hr (O-Ring) as per ASTM D395-89 | | | | | | | |
| O-Ring (%) | NR | 34 | 65 | NR | 32 | 26 | 24 | 9 |

\*comparative examples

As can be appreciated from the above table by comparing example 1 with 1A or 1B and example 2 with 2A or 2B, the addition of the organic hydride containing compound (silane) results in a curable composition that yields a fluoroelastomer having comparable to those described in the prior art that use bromine or iodine as a cure site component. Absent the organic hydride containing compound, polymer A which does not include bromine or iodine, cannot be cured to a fluoroelastomer (see comparative examples 1 and 2). Comparing examples 3 and 3A shows further that the addition of a silane improves several physical properties of an elastomer resulting from a composition that includes fluoropolymer B. The improved physical properties include:

Higher final torque (MH) and delta torque in curing,
Faster t'90
Lower tan delta,
Higher tensile and modulus in Press Cure and Post Cure,
Greatly improved Compression Set.

What is claimed is:

1. A composition for making a fluoroelastomer comprising:
   (a) a fluoropolymer containing chlorine;
   (b) an organic compound comprising at least one hydride function MH wherein M is selected from the group consisting of Si, Ge, Sn and Pb; and
   (c) a free radical generating compound and a coagent having one or more groups capable of participating in a free radical cure reaction wherein the fluoropolymer is free from bromine and iodine.

2. A composition according to claim 1 wherein the fluoropolymer contains chlorine in an amount of 0.01% to 15% by weight based on the weight of the fluoropolymer.

3. A composition according to claim 1 wherein the fluoropolymer containing chlorine has a bimodal or multimodal molecular weight distribution.

4. A composition according to claim 1 wherein said organic compound comprising at least one hydride function MH corresponds to the formula:

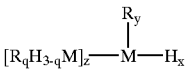

wherein R represents a hydrocarbon group optionally comprising one or more substituents and wherein the R groups may be the same or different and whereby two R groups may be linked to each other so as to form a ring, M is as defined in claim 1, q is a value of 1 to 3, x is a value of 1 to 3, y and z represent a value of 0 to 3 and the sum of y+z=4−x.

5. A composition according to claim 1 wherein said organic compound is a polymeric compound and said hydride function is comprised in a terminal group and/or comprised in a repeating unit of said polymeric compound.

6. A composition according to claim 1 wherein said organic compound is a siloxane having one or more —SiH functions.

7. A composition according to claim 1 wherein said organic compound is a siloxane having one or more —OSiH groups.

8. A composition according to claim 1 wherein said organic compound is a siloxane that corresponds to the formula:

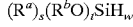

wherein each $R^a$ independently represents an alkyl group or an aryl group each of which may optionally be substituted, each $R^b$ independently represents an alkyl group which may optionally be substituted, w represents a value of 1 to 3, s and t are 0 to 3 and the sum of s+t+w is 4.

9. A composition according to claim 1 wherein said organic compound is a polysiloxane corresponding to the formula:

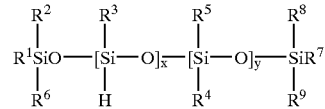

wherein $R^1$, $R^2$, $R^3$, $R^6$, $R^7$, $R^8$ and $R^9$ each independently represents hydrogen, an alkoxy group, an alkyl group which may optionally be substituted or aryl group which may optionally be substituted, $R^4$ and $R^5$ each independently represents an alkoxy group, an alkyl which may optionally be substituted or aryl group which may optionally be substituted, x represents a value of 0 to 150, y represents a value of 0 to 150 and with the proviso that when x=0, at least one of $R^1$, $R^2$, $R^6$, $R^7$, $R^8$ and $R^9$ represents a hydrogen atom.

10. A composition according to claim 1 wherein said organic compound is a disiloxane or a cyclic polysiloxane.

11. A composition according to claim 1 wherein said organic compound is a cyclic siloxane corresponding to the formula:

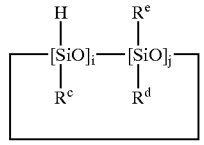

wherein $R^c$ represents hydrogen, an alkyl group which may optionally be substituted or an aryl group which may optionally be substituted, $R^d$ and $R^e$ each independently represents an alkyl which may optionally be substituted or aryl group which may optionally be substituted, is at least 1 and the sum of i+j is at least 3.

12. A composition according to claim 1 wherein said fluoropolymer is a copolymer comprising repeating units derived from a fluorinated monomer and a monomer having one or more chlorine atoms.

13. A composition according to claim 12 wherein said monomer having one or more chlorine atoms is a fluorinated monomer having one or more chlorine atoms.

14. A composition according to claim 12 wherein said monomer having one or more chlorine atoms is selected from the group consisting of vinyl chloride, vinylidene chloride and a fluoroolefin having one or more chlorine atoms.

15. A composition according to claim 12 wherein said fluoropolymer is a copolymer of tetrafluoroethylene and/or vinylidene fluoride and a fluoroolefin having one or more chlorine atoms and optionally one or more monomers selected from the group consisting of $C_3$–$C_8$ fluorinated olefins, fluorinated vinyl ethers, fluorinated allyl ethers, ethylene and propylene.

16. A composition according to claim 1 wherein said free radical generating compound comprises an organic peroxide and said coagent is a polyunsaturated organic compound.

17. A composition according to claim 16 wherein said coagent is selected from the group consisting of triallyl-cyanurate, triallyl-isocyanurate, triallyl trimellitate, tris(diallylamino)-s-triazine, triallyl-phosphite, N,N-diallylacrylamide, hexaallyl-phosphoramide, N,N'-m-phenylenebismaleimide, diallyl-phthalate and tri(5-norbomene-2-methylene)-cyanurate.

18. A composition according to claim 16 wherein said fluoropolymer comprises one of more chlorines on a terminating group, said chlorines being capable of participating in an organic peroxide cure reaction.

19. A fluoroelastomer composition derivable from the curing of a composition of claim 1.

20. Shaped article comprising the fluoroelastomer composition of claim 19.

21. Multi-layer article comprising a layer of a fluoroelastomer derivable from curing of the composition of claim 1.

22. Multi-layer article according to claim 21 said layer of said fluoroelastomer is bonded to a layer of thermoplastic fluoropolymer.

23. Multi-layer article according to claim 22 wherein said thermoplastic fluoropolymer comprises chlorine, bromine, iodine, or combinations thereof.

24. Multi-layer article according to claim 21, wherein said layer of said fluoroelastomer is bonded to a silicone rubber.

25. Method of making a fluoroelastomer comprising providing a curable fluoroelastomer composition as defined in claim 1 and heating said curable fluoroelastomer composition to obtain a desired level of curing.

* * * * *

UNITED STATES PATENT AND TRADEMARK OFFICE
CERTIFICATE OF CORRECTION

PATENT NO. : 6,916,871 B2
DATED : July 12, 2005
INVENTOR(S) : Hare, Erik D.

It is certified that error appears in the above-identified patent and that said Letters Patent is hereby corrected as shown below:

Column 3,
Line 54, delete "MU" and insert -- MH --, therefor.

Column 8,
Line 67, delete "coagent" and insert -- coagents --.

Column 9,
Line 1, delete "coagent" and insert -- coagents --.
Line 6, after "triazine" delete "," and insert -- ; --.
Line 9, insert -- ; -- before "N".

Column 13,
Line 23, delete "MPa" and insert -- (MPa) --.

Column 15,
Line 2, after "substituted," insert -- i --.

Column 16,
Line 15, after "claim 21" insert -- wherein --.

Signed and Sealed this

Eleventh Day of October, 2005

JON W. DUDAS
*Director of the United States Patent and Trademark Office*